(12) United States Patent
Lee et al.

(10) Patent No.: US 8,302,715 B2
(45) Date of Patent: Nov. 6, 2012

(54) APPARATUS FOR OPENING AND CLOSING AIR FLAP FOR VEHICLE

(75) Inventors: Seung Hyeob Lee, Ansan-si (KR); Jun Ho Cha, Hwaseong-si (KR); Jin Young Yoon, Hwaseong-si (KR); Jeong Gil Park, Ulsan (KR); Hun Soo Kim, Bucheon-si (KR); Yun Seok Kim, Yongin-si (KR); Yong Suk Shin, Anyang-si (KR); Bo Hwan Cha, Gyeongsan-si (KR)

(73) Assignee: Kia Motors Corp., Seoul (KR)

( * ) Notice: Subject to any disclaimer, the term of this patent is extended or adjusted under 35 U.S.C. 154(b) by 310 days.

(21) Appl. No.: 12/767,628

(22) Filed: Apr. 26, 2010

(65) Prior Publication Data
US 2011/0073395 A1    Mar. 31, 2011

(30) Foreign Application Priority Data

Sep. 30, 2009    (KR) .................. 10-2009-0092919

(51) Int. Cl.
*B60K 11/08*    (2006.01)
(52) U.S. Cl. .................. 180/68.1; 123/41.04; 123/41.05
(58) Field of Classification Search .................. 180/68.1, 180/68.2, 68.3, 68.4, 68.6; 123/41.01, 41.02, 123/41.04, 41.05, 41.06
See application file for complete search history.

(56) References Cited

U.S. PATENT DOCUMENTS

| 2,783,978 | A  | * | 3/1957 | Baumgarten | .................. 165/44 |
| 7,766,111 | B2 | * | 8/2010 | Guilfoyle et al. | ............ 180/68.1 |
| 8,118,124 | B2 | * | 2/2012 | Shin et al. | .................... 180/68.1 |
| 8,161,919 | B2 | * | 4/2012 | Klotz et al. | ................ 123/41.04 |

FOREIGN PATENT DOCUMENTS
KR    1998-046232 A    9/1998
* cited by examiner

*Primary Examiner* — John Walters
(74) *Attorney, Agent, or Firm* — Morgan, Lewis & Bockius LLP

(57) ABSTRACT

Disclosed herein is an apparatus for opening and closing an air flap for a vehicle. The apparatus for opening and closing an air flap may include a coolant temperature sensor provided at an engine to measure a coolant temperature of the engine, a control unit comparing a measurement value input from the coolant temperature sensor with a reference value stored therein, thus outputting a control signal, an actuator rotating in response to the control signal of the control unit, a power transmission unit connected to the actuator to transmit rotating force of the actuator, and a flap unit installed in an opening of a front end module carrier, and being selectively movable in a vertical direction in the opening by power transmitted from the power transmission unit to the flap unit to open or close the opening, thus permitting or preventing an inflow of air into the cooling module.

9 Claims, 7 Drawing Sheets

APPARATUS FOR OPENING AND CLOSING AIR FLAP FOR VEHICLE

CROSS-REFERENCE TO RELATED APPLICATIONS

The present application claims priority to Korean Patent Application Number 10-2009-0092919 filed on Sep. 30, 9, the entire contents of which application is incorporated herein for all purpose by this reference.

BACKGROUND OF THE INVENTION

1. Field of the Invention

The present invention relates to an apparatus for opening and closing an air flap for a vehicle which is moved up and down to permit external air to flow into a cooling module only when a coolant temperature is within a range of overheating after an engine has warmed up, and to prevent air from flowing into the cooling module except when the coolant temperature is within the range of overheating.

2. Description of Related Art

Generally, a water-cooling type cooling device includes a water jacket which surrounds a cylinder and a combustion chamber, a water pump which forces water to flow into the cylinder, a radiator which transmits heat from high-temperature coolant to the atmosphere so as to cool the coolant, a fan which helps the radiator to circulate the air, and a thermostat which is used to rapidly regulate the temperature of the coolant immediately after starting an engine.

The operation of the water-cooling type cooling device will now be described. That is, a coolant passage is formed in each of a cylinder block and a cylinder head, so that water flows through the coolant passage to cool respective parts of the engine. The coolant used to cool the cylinder block is forcibly fed from a radiator hose to the radiator by the water pump which is driven by a crank shaft pulley. The coolant fed to the radiator dissipates heat, and thereafter is returned to the engine again so as to cool it.

The radiator is a kind of tank which has a large heat dissipating area and may contain a large quantity of water therein. The radiator includes a pipe through which water flows and fins which are in contact with the air, and is formed to have a large heat dissipating area so as to dissipate as much heat as is possible to the atmosphere. In order to separate the radiator from the outside of a vehicle and provide a good appearance to the vehicle, a radiator grill is mounted to a predetermined portion of a front bumper of the vehicle.

The radiator grill allows a predetermined amount of air to flow through the front of the vehicle, in addition to physically protecting the radiator from impurities which enter the front of the vehicle along with the air.

However, the radiator grill is problematic in that it is always open, so that external air may undesirably flow into a cooling module and thereby cool it before the engine has warmed up. Consequently, the engine is warmed up slower.

Further, a wind generated while the vehicle is being driven flows through the radiator grill which is always open into an engine room, thus causing the deterioration of aerodynamic performance.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an apparatus for opening and closing an air flap for a vehicle, which prevents external air from flowing into a cooling module before an engine has warmed up, thus shortening the time required to warm up the engine, and to provide an apparatus for opening and closing an air flap for a vehicle, which prevents the inflow of external air when it is unnecessary to cool a cooling module, thus improving the aerodynamic performance of the vehicle when it is being driven.

In an aspect of the present invention, the apparatus for opening and closing an air flap for a vehicle, may include a coolant temperature sensor provided at a predetermined position of an engine to measure a coolant temperature of the engine, a control unit comparing a measurement value input from the coolant temperature sensor with a reference value stored therein, thus outputting a control signal, an actuator rotating forwards or backwards in response to the control signal of the control unit, a power transmission unit connected to the actuator to transmit rotating force of the actuator, and a flap unit installed in an opening of a front end module carrier which extends from a radiator grill to a cooling module, and being selectively movable in a vertical direction in the opening by power transmitted from the power transmission unit to the flap unit to open or close the opening, thus permitting or preventing an inflow of air into the cooling module, wherein when the measurement value of the coolant temperature sensor is smaller than the reference value, the control unit transmits the control signal to the actuator so that the flap unit closes the opening and when the measurement value of the coolant temperature sensor is larger than the reference value of the control unit, the control unit transmits the control signal to the actuator so that the flap unit opens the opening in order to prevent the engine from overheating.

The flap unit may include guide columns provided in the opening to extend in a vertical direction thereof; and spaced apart from each other at regular intervals in a widthwise direction of the opening, an upper flap provided on a side of each of the guide columns, fitted into the opening in such a way as to move vertically, and occupying about half of an area of the opening, and a lower flap provided on an opposite side of each of the guide columns, fitted into the opening in such a way as to move vertically, and occupying a remaining about half of the area of the opening, wherein the upper flap includes at least an air hole therein, and wherein the lower flap includes at least an air hole therein.

The power transmission unit may include a rotating shaft connected to the actuator, at least one pinion gear provided on at least one position of the rotating shaft, and a rack gear provided on each of the upper and lower flaps to engage with the pinion gear therebetween, wherein the upper flap includes a sealing plate at a lower portion thereof to receive the at least one pinion gear therein, and wherein the lower flap includes a sealing plate at an upper portion thereof to receive at least one pinion gear therein.

The rotating shaft may be rotatably installed to pass through the guide columns, the pinion gear being provided on each of opposite ends of the rotating shaft.

A guide rail may protrude from each of the guide columns, and a guide groove is formed in at least one of the upper and lower flaps so that the guide rail is fitted into the guide groove.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the exemplary embodiment of the present invention will be described in detail with reference to the accompanying drawings.

Figure 1:
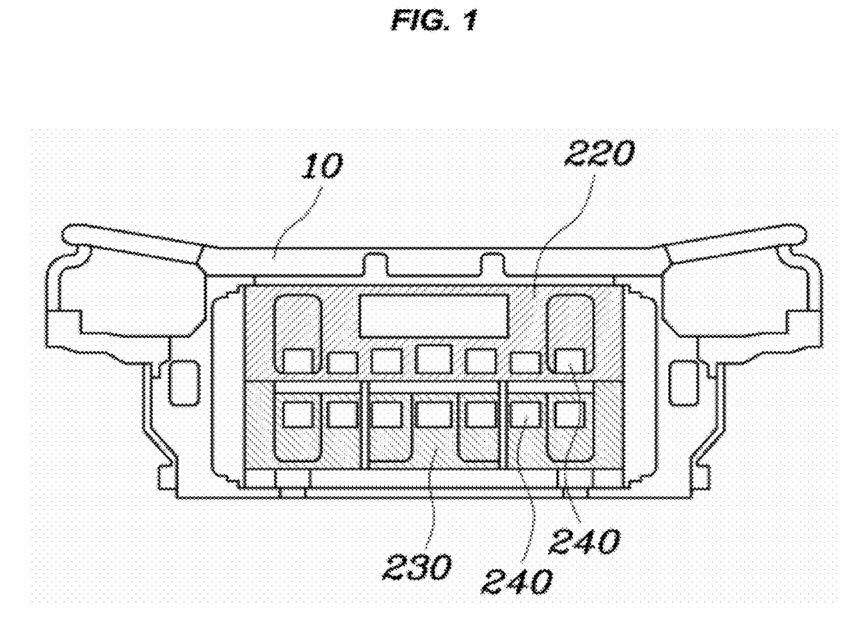
FIG. 1 is a front view illustrating a front end module carrier to which an exemplary apparatus for opening and closing an air flap for a vehicle according to the present invention is installed.
Figure 2:
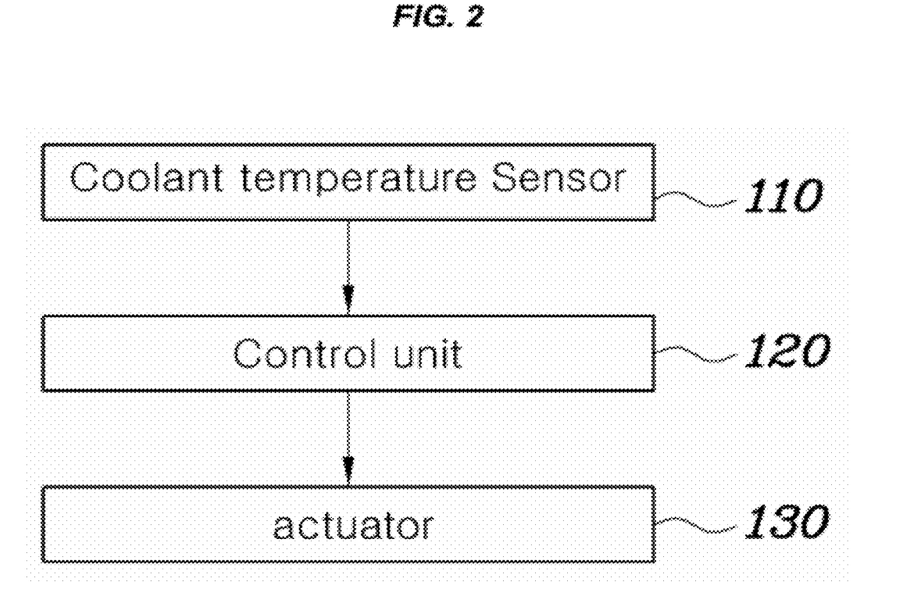
FIG. 2 is a block diagram illustrating the control logic of the exemplary air flap opening and closing apparatus according to the present invention.
Figure 3:
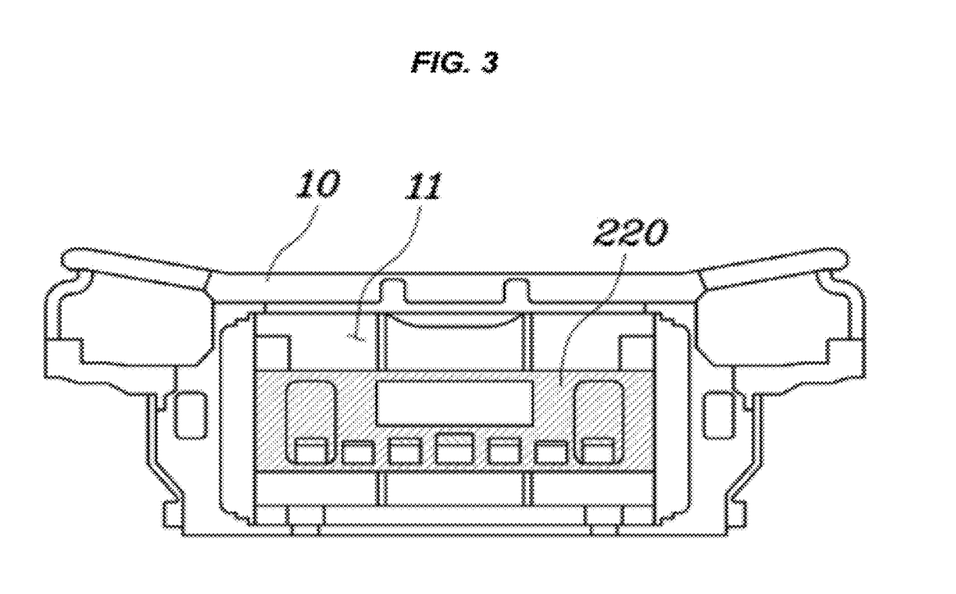
FIG. 3 is a front view illustrating the state in which an opening of the carrier is open by the exemplary air flap opening and closing apparatus according to the present invention.
Figure 4:
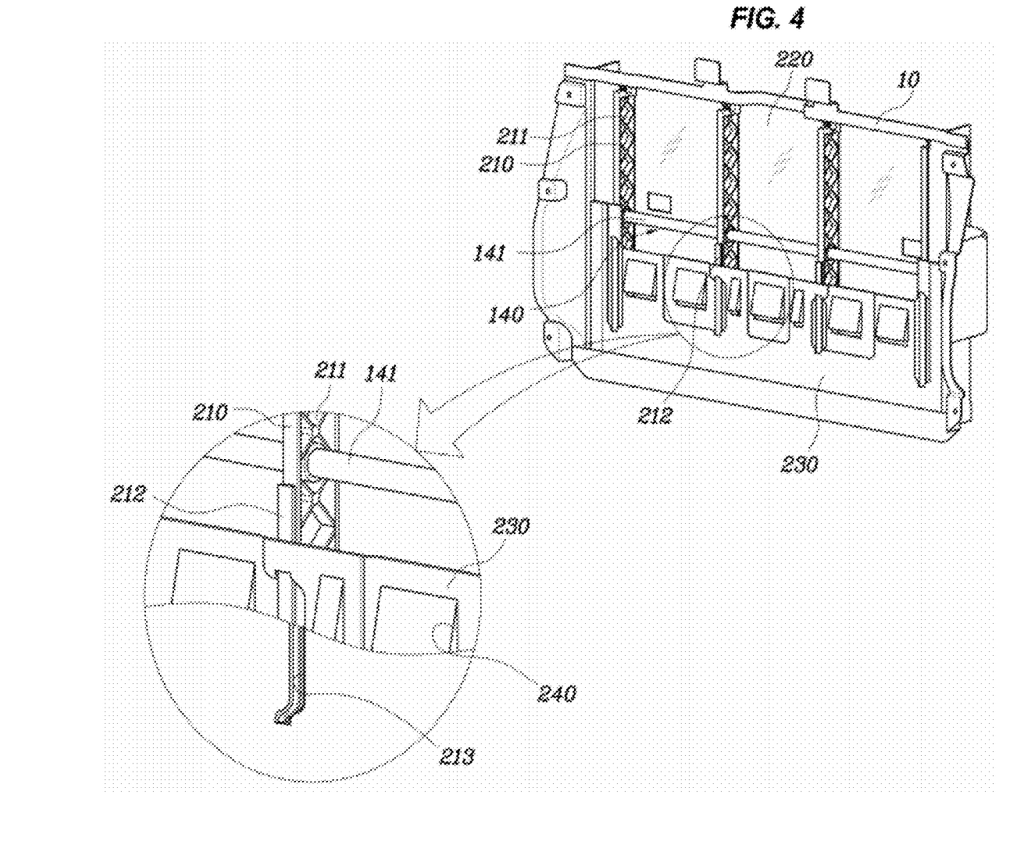
FIG. 4 is a perspective view illustrating the exemplary air flap opening and closing apparatus according to the present invention.
Figure 5:
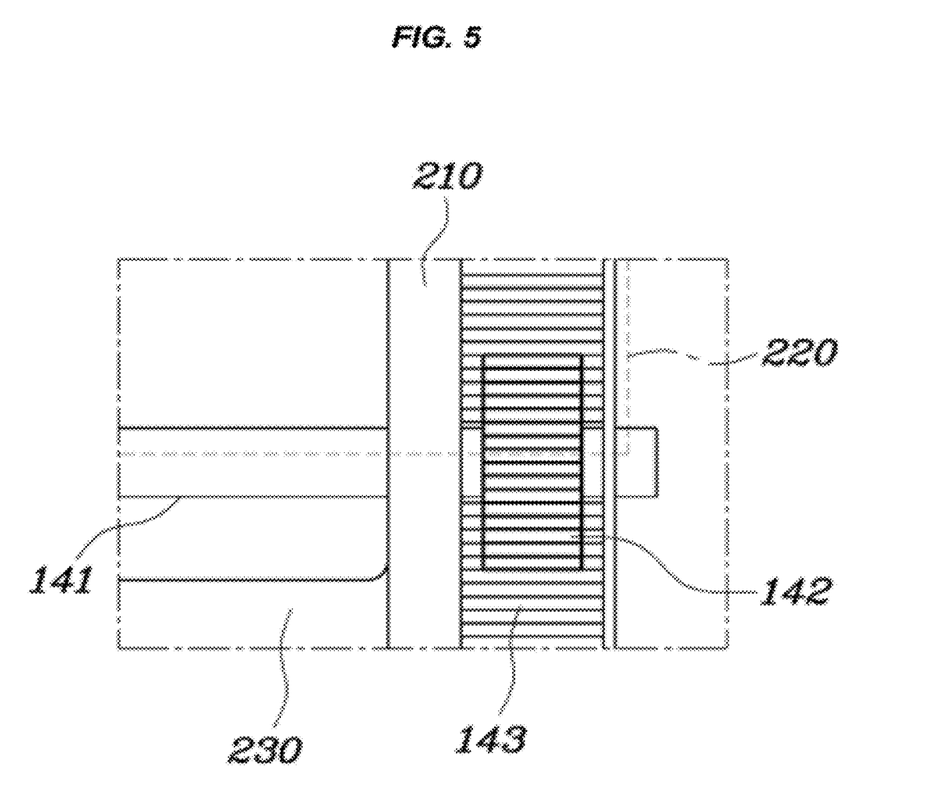
FIG. 5 is a sectional view illustrating a power transmission unit of the exemplary air flap opening and closing apparatus according to the present invention.
Figure 6:
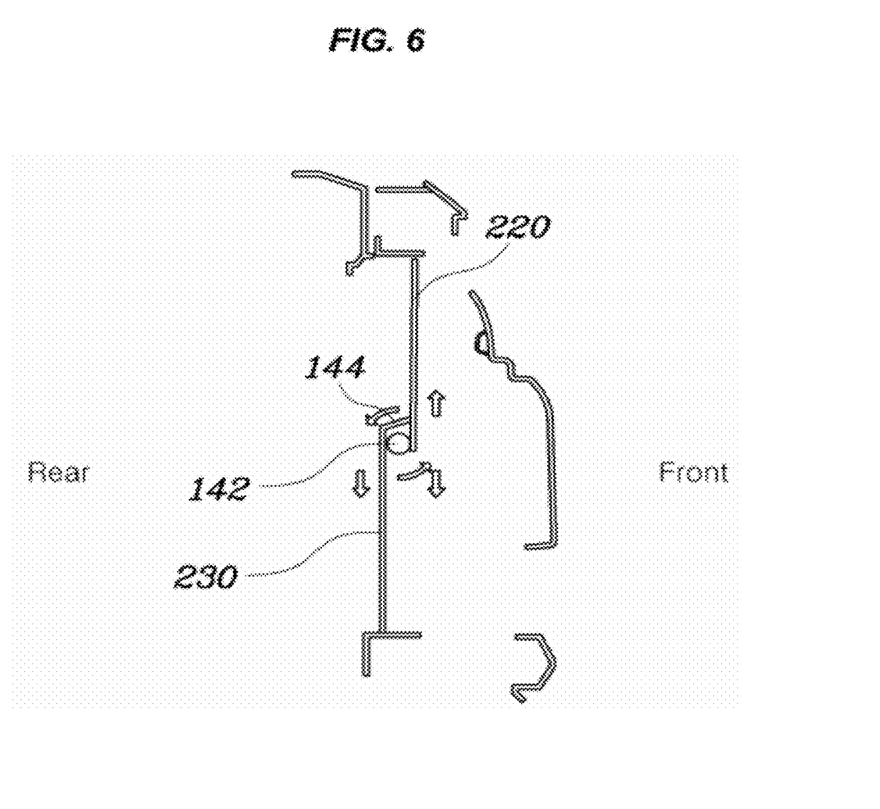
FIGS. 6 and 7 are views illustrating the operation of the exemplary air flap opening and closing apparatus according to the present invention.
Figure 7:
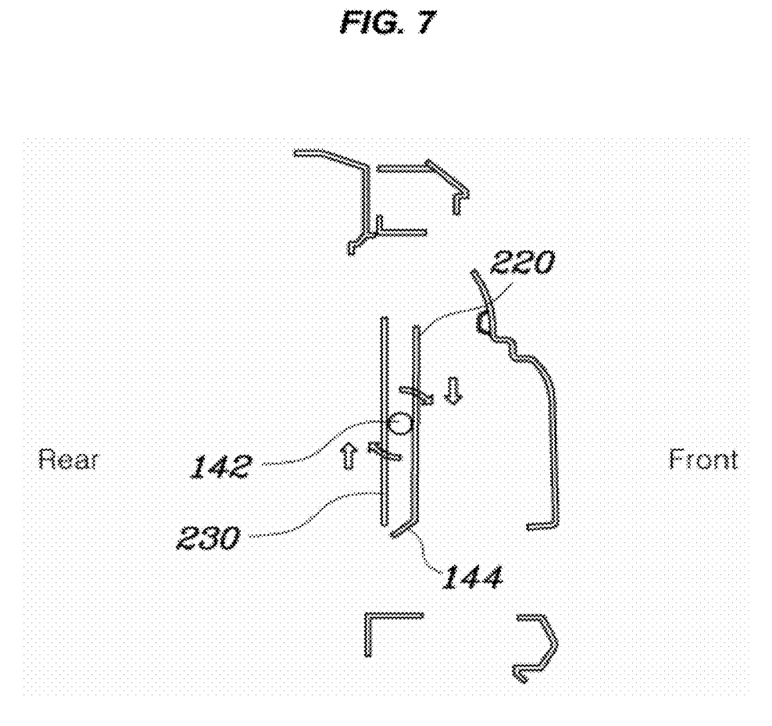

FIG. 1 is a front view illustrating a front end module carrier to which an apparatus for opening and closing an air flap for a vehicle according to an exemplary embodiment of the present invention is installed, FIG. 2 is a block diagram illustrating the control logic of the air flap opening and closing apparatus according to an exemplary embodiment of the present invention, FIG. 3 is a front view illustrating the state in which an opening of the carrier is open by the air flap opening and closing apparatus according to an exemplary embodiment of the present invention, FIG. 4 is a perspective view illustrating the air flap opening and closing apparatus according to an exemplary embodiment of the present invention, FIG. 5 is a sectional view illustrating a power transmission unit of the air flap opening and closing apparatus according to an exemplary embodiment of the present invention, and FIGS. 6 and 7 are views illustrating the operation of the air flap opening and closing apparatus according to an exemplary embodiment of the present invention.

As shown in FIGS. 1 and 2, the air flap opening and closing apparatus according to an exemplary embodiment of the present invention is installed in an opening 11 of the front end module carrier (hereinafter, referred to as the "carrier 10"), thus opening or closing the opening 11.

The carrier 10 is positioned between a radiator grill provided on the front of the vehicle and a cooling module. The opening 11 is formed in the carrier 10 to allow air to flow from the radiator grill to the cooling module.

Thus, air fed from the outside of the vehicle through the radiator grill flows through the air flap opening and closing apparatus of the present invention installed in the opening 11 into the cooling module. At this time, the air cools the cooling module to lower the temperature of coolant.

As such, the air flap opening and closing apparatus according to an exemplary embodiment of the present invention installed in the opening 11 of the carrier 10 includes a coolant temperature sensor 110, a control unit 120, an actuator 130, a power transmission unit 140, and a flap unit The coolant temperature sensor 110 is provided at a predetermined position (generally, a coolant circulation system) of an engine to measure the coolant temperature of the vehicle. Since the coolant temperature of the engine is a factor which is important to grasp information on the engine, an electronic control engine is usually provided with the coolant temperature sensor 110. Thus, the coolant temperature sensor 110 which is generally installed in the engine may be used, in place of additionally installing the coolant temperature sensor 110.

Further, the control unit 120 is electrically connected to the coolant temperature sensor 110, and functions to compare a measurement value input from the coolant temperature sensor 110 with a reference value stored in the control unit 120, thus outputting a control signal.

Further, the actuator 130 is operated in response to the control signal of the control unit 120, and rotates forwards or backwards depending on the control signal.

That is, the actuator 130 is rotated in either one of the directions in response to the control signal of the control unit 120. Here, the actuator 130 includes a bidirectional motor which is rotatable forwards and backwards. Since such an actuator 130 is widely known to those skilled in the art, the detailed description will be omitted herein.

Further, the power transmission unit 140 is connected to the actuator 130 to transmit rotating force from the actuator 130 to the flap unit which will be described below in detail, thus actuating the flap unit.

The detailed construction and configuration of the power transmission unit 140 will be described after the flap unit is described.

As shown in FIGS. 3 to 5, the flap unit is installed in the opening 11 of the carrier 10, which makes the radiator grill communicate with the cooling module such as a radiator or an air-conditioner condenser. When power is transmitted from the power transmission unit 140 to the flap unit, the flap unit moves up and down in the opening 11, thus permitting or preventing the inflow of air into the cooling module.

When the measurement value of the coolant temperature sensor 110 is smaller than the reference value stored in the control unit 120, the control unit 120 determines that the engine has not warmed up yet and transmits a control signal to the actuator 130 so that the flap unit closes the opening 11 of the carrier 10.

Further, when the measurement value of the coolant temperature sensor 110 is larger than the reference value of the control unit 120, the control unit 120 determines that the engine has warmed up, and transmits a control signal to the actuator 130 so that the flap unit opens the opening 11 in order to prevent the engine from overheating.

The flap unit opens or closes the opening 11 of the carrier 10 in concert with the operation of the actuator 130, thus preventing air from being fed from the radiator grill to the cooling module to enable rapid warming-up, and allowing the cooling module to be cooled after warming-up to prevent the engine from overheating.

The flap unit includes guide columns 210, an upper flap 220, and a lower flap 230.

As shown in FIG. 4, each guide column 210 is the member which is provided in the opening 11 in such a way as to extend long in a vertical direction. The guide columns 210 are arranged in the widthwise direction of the opening 11 to be spaced apart from each other at regular intervals.

Each guide column 210 may be provided with a plurality of ribs 211 to reduce weight and retain a predetermined strength.

Further, the upper flap 220 is provided on one side of the guide columns 210, and is fitted into the opening 11 in such a way as to move vertically. Thereby, the upper flap 220 occupies about half of the area of the opening 11.

The lower flap 230 is provided on the other side of the guide columns 210, and is fitted into the opening 11 in such a way as to move vertically. Thereby, the lower flap 230 occupies about a remaining half of the area of the opening 11. When the upper flap 220 and the lower flap 230 move vertically to be far away from each other, the opening 11 is closed to block the flow of air. In contrast, when the upper flap 220 and the lower flap 230 move to be near to each other, the opening 11 is partially open, so that air is introduced into the cooling module.

That is, when the upper flap 220 moves downwards and the lower flap 230 moves upwards, as shown in FIG. 3, the upper and lower portions of the opening 11 are open, so that air is fed through the open portions of the opening 11 to the cooling module.

Meanwhile, when the upper flap 220 moves upwards to be disposed in the upper portion of the opening 11 and the lower flap 230 moves downwards to be disposed in the lower portion of the opening 11, the entire opening 11 is closed by the upper flap 220 and the lower flap 230 and thus the flow of the air is blocked.

Meanwhile, the power transmission unit 140 includes a rotating shaft 141, a pinion gear 142 and a rack gear 143.

The rotating shaft 141 is connected to the actuator 130 to be rotated in the same direction as the rotating direction of the actuator 130. Thus, the rotating shaft 141 performs forward or backward rotation.

The pinion gear 142 is provided on at least one place of the rotating shaft 141 and is rotated integrally with the rotating shaft 141.

Further, the rack gear 143 is provided on the upper flap 220 and the lower flap 230 in such a way as to correspond to the pinion gear 142, and engages with the pinion gear 142.

Thus, when the actuator 130 is rotated in either one of the directions in response to the control signal of the control unit 120, the rotating force is transmitted from the actuator 130 through the rotating shaft 141 to the pinion gear 142, and the rotating force of the pinion gear 142 is transmitted to the rack gear 143, thus simultaneously moving the upper flap 220 and the lower flap 230.

As shown in FIGS. 6 and 7, the upper flap 220 and the lower flap 230 are placed, respectively, in front of and in back of the pinion gear 142. Thus, according to the rotating direction of the pinion gear 142, the upper flap 220 and the lower flap 230 move upwards and downwards, respectively, thus closing the opening 11 (see FIG. 6). Alternatively, the upper flap 220 and the lower flap 230 move downwards and upwards, respectively, so that the upper and lower flaps 220 and 230 meet at a middle position in a height direction of the opening 11, thus partially opening the upper and lower portions of the opening 11 (see FIG. 7).

As shown in FIGS. 4 and 5, the rotating shaft 141 is rotatably installed to pass through the guide columns 210, and the pinion gear 142 is provided on each of opposite ends of the rotating shaft 141.

The rotating shaft 141 is installed to pass through the guide columns 210, so that it is advantageous to simultaneously transmit rotating force from the pinion gear 142 to the upper and lower flaps 220 and 230, because the upper flap 220 and the lower flap 230 are provided, respectively, on one and the other side of the guide columns 210.

Of course, the air flap opening and closing apparatus may be provided with only one pinion gear 142. However, two pinion gears are provided on the opposite ends of the rotating shaft 141 such that one pinion gear is provided on each end, thus allowing the upper and lower flaps 220 and 230 to efficiently move up and down with a minimum number of pinion gears.

In order to prevent the upper or lower flap 220 or 230 from being removed from the guide columns 210 when at least one of the upper and lower flap 220 and 230 moves up and down along the guide columns 210, a guide rail 212 protrudes from each guide column 210, as shown in FIG. 4.

Further, it is preferable that a guide groove 213 be formed in at least one of the upper flap 220 and the lower flap 230 so that the guide rail 212 is fitted into the guide groove 213. The flap having the guide groove 213 engages with the guide rail 212, so that the flap may move up and down while not being removed from the guide column 210.

In FIG. 4, the guide groove 213 engaging with the guide rail 212 is formed in only the lower flap 230. Although not shown in the drawings, the upper flap 220 may also have the same structure as the lower flap 230.

In an exemplary embodiment of the present invention, the lower flap 230 and/or the upper flap 220 may include a sealing plate 144 at upper side and lower side respectively such that the power transmission unit 140 is protected therein as shown in FIGS. 6 and 7.

The present invention, in an exemplary embodiment, may further include air holes 240 at the lower flap 230 and/or the upper flap 220 such that the coolant temperature can be further precisely controlled by regulating an overlapping area of the air holes 240 of the lower flap 230 and the upper flap 220 or an overlapping area of the air holes 240 of the lower or upper flap 230 and 220 with the area not formed of the air holes 240 in corresponding lower or upper flap 230 and 220.

As is apparent from the above description, an apparatus for opening and closing an air flap for a vehicle according to an exemplary embodiment of the present invention provides an advantage in that upper and lower flaps are moved vertically to prevent external air from flowing into a cooling module before an engine has warmed up, thus shortening the time required to warm up the engine, therefore improving the performance of the engine.

Further, an apparatus for opening and closing an air flap for a vehicle according to an exemplary embodiment of the present invention provides an advantage in that the inflow of external air into a cooling module is prevented when it is unnecessary to cool the cooling module, thus preventing the aerodynamic performance of the vehicle from being deteriorated because of the introduced air.

Furthermore, an apparatus for opening and closing an air flap for a vehicle according to an exemplary embodiment of the present invention provides an advantage in that two upper and lower flaps are operated in conjunction with each other by one actuator, thus realizing a simple construction and structure.

For convenience in explanation and accurate definition in the appended claims, the terms "upper", "lower", "front" and "back" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for opening and closing an air flap for a vehicle, comprising:
    a coolant temperature sensor provided at a predetermined position of an engine to measure a coolant temperature of the engine;
    a control unit comparing a measurement value input from the coolant temperature sensor with a reference value stored therein, thus outputting a control signal;
    an actuator rotating forwards or backwards in response to the control signal of the control unit;
    a power transmission unit connected to the actuator to transmit rotating force of the actuator; and
    a flap unit installed in an opening of a front end module carrier which extends from a radiator grill to a cooling module, and being selectively movable in a vertical direction in the opening by power transmitted from the power transmission unit to the flap unit to open or close the opening, thus permitting or preventing an inflow of air into the cooling module,
    wherein the flap unit comprises:
        guide columns provided in the opening to extend in a vertical direction thereof, and spaced apart from each other at regular intervals in a widthwise direction of the opening;
        an upper flap provided on a side of each of the guide columns, fitted into the opening in such a way as to move vertically, and occupying about half of an area of the opening; and
        a lower flap provided on an opposite side of each of the guide columns, fitted into the opening in such a way as to move vertically, and occupying a remaining about half of the area of the opening.

2. The apparatus as set forth in claim 1, wherein when the measurement value of the coolant temperature sensor is smaller than the reference value, the control unit transmits the control signal to the actuator so that the flap unit closes the opening and when the measurement value of the coolant temperature sensor is larger than the reference value of the control unit, the control unit transmits the control signal to the actuator so that the flap unit opens the opening in order to prevent the engine from overheating.

3. The apparatus as set forth in claim 1, wherein the upper flap includes at least an air hole therein.

4. The apparatus as set forth in claim 1, wherein the lower flap includes at least an air hole therein.

5. The apparatus as set forth in claim 1, wherein the power transmission unit comprises:
    a rotating shaft connected to the actuator;
    at least one pinion gear provided on at least one position of the rotating shaft; and
    a rack gear provided on each of the upper and lower flaps to engage with the pinion gear therebetween.

6. The apparatus as set forth in claim 5, wherein the upper flap includes a sealing plate at a lower portion thereof to receive the at least one pinion gear therein.

7. The apparatus as set forth in claim 6, wherein a guide rail protrudes from each of the guide columns, and a guide groove is formed in at least one of the upper and lower flaps so that the guide rail is fitted into the guide groove.

8. The apparatus as set forth in claim 5, wherein the lower flap includes a sealing plate at an upper portion thereof to receive at least one pinion gear therein.

9. The apparatus as set forth in claim 5, wherein the rotating shaft is rotatably installed to pass through the guide columns, the pinion gear being provided on each of opposite ends of the rotating shaft.

* * * * *